US006420493B1

(12) United States Patent
Ryckis-Kite et al.

(10) Patent No.: US 6,420,493 B1
(45) Date of Patent: Jul. 16, 2002

(54) TWO COMPONENT CHEMICALLY THERMOSET COMPOSITE RESIN MATRIX FOR USE IN COMPOSITE MANUFACTURING PROCESSES

(75) Inventors: Gail Ryckis-Kite, Sherwood Park; David Slaback, St. Albert, both of (CA)

(73) Assignee: Resin Systems Inc., Edmonton (CA)

( * ) Notice: Subject to any disclaimer, the term of this patent is extended or adjusted under 35 U.S.C. 154(b) by 0 days.

(21) Appl. No.: 09/609,008

(22) Filed: Jun. 26, 2000

(30) Foreign Application Priority Data

May 29, 2000 (CA) ............................................. 2310166

(51) Int. Cl.⁷ ............................................. C08L 75/04
(52) U.S. Cl. ........................... 525/440; 528/66; 528/67; 528/73; 528/76; 528/77; 528/83; 525/438; 524/872; 524/873; 524/875
(58) Field of Search ............................... 328/67, 73, 76, 328/77, 83, 66; 525/440, 438; 524/873, 872, 875

(56) References Cited

U.S. PATENT DOCUMENTS

| 4,857,579 A | 8/1989 | Domeier ...................... 524/507 |
| 4,863,994 A | 9/1989 | Nelson et al. ............... 524/874 |
| 4,868,223 A | 9/1989 | Nelson et al. ............... 521/122 |
| 5,578,680 A | 11/1996 | Ando et al. .................. 525/131 |
| 5,614,575 A * | 3/1997 | Kotschar ..................... 524/270 |
| 5,852,135 A | 12/1998 | Kanai et al. ................. 525/398 |
| 5,895,718 A | 4/1999 | Ishimura et al. ............. 525/437 |
| 5,906,704 A | 5/1999 | Matsuura et al. ......... 156/331.4 |
| 5,912,315 A | 6/1999 | Horiie .......................... 528/71 |
| 5,948,505 A | 9/1999 | Puppin ........................ 428/121 |
| 5,973,099 A | 10/1999 | Nodelman et al. .......... 528/74.5 |
| 5,976,610 A | 11/1999 | Scholz et al. ............... 427/2.31 |
| 6,015,856 A | 1/2000 | Matsushita et al. ......... 524/451 |
| 6,020,063 A | 2/2000 | Riffle et al. ................. 428/357 |
| 6,051,643 A | 4/2000 | Hasegawa et al. .......... 524/445 |

FOREIGN PATENT DOCUMENTS

WO    WO 00/29459    5/2000

* cited by examiner

*Primary Examiner*—Patricia A. Short
(74) *Attorney, Agent, or Firm*—Christensen O'Connor Johnson Kindness PLLC

(57) ABSTRACT

A two component chemically thermoset composite resin matrix for use in composite manufacturing processes includes a solvent free polyisocyanate component and a solvent free polyol component. The solvent free polyisocyanate component is either an aromatic polyisocyanate, an aliphatic polyiscyanate or a blend of both. The solvent free polyol component is either a polyether polyol, a polyester polyol or a blend of both. The polyisocyanate component and the polyol component are in relative proportions in accordance with an OH/NCO equivalent ratio of 1:1 to 1:2. The components form a relatively low cost polyurethane composite resin having a useful range of physical properties, without the emission of volatile organic compounds during curing.

37 Claims, No Drawings

TWO COMPONENT CHEMICALLY THERMOSET COMPOSITE RESIN MATRIX FOR USE IN COMPOSITE MANUFACTURING PROCESSES

FIELD OF THE INVENTION

The present invention relates to a two component chemically thermoset composite resin for use in composite manufacturing processes.

BACKGROUND OF THE INVENTION

The styrene and solvent content of composite resins presently in use contribute to lost time in the work place as a result of precautions which must be taken for the safety of the workers due to emissions given off during the curing process. There has long been recognized a need to switch to a volatile organic compound (VOC) free composite resin. All VOC free composite resins, such as thermoplastic polyurethanes and epoxies, are either too expensive or do not exhibit the properties necessary for use in consumer products.

SUMMARY OF THE INVENTION

What is required is a VOC free composite resin that is less expensive to produce and yet has the necessary physical properties for use in composite manufacturing processes for consumer products.

According to the present invention there is provided a two component chemically thermoset composite resin which includes a solvent free polyisocyanate component and a solvent free polyol component. The solvent free polyisocyanate component is either an aromatic polyisocyanate, an aliphatic polyisocyanate or a blend of both. The solvent free polyol component is either a polyether polyol, a polyester polyol or a blend of both. The polyisocyanate component and the polyol component are in relative proportions in accordance with an OH/NCO equivalent ratio for 1:1 to 1:2.

While fibre type and style determine the ultimate strength potential of a product, the matrix resin determines the actual level of properties realized through effective coupling and stress transfer efficiency. Among these properties are flexural strength, impact resistance, high temperature performance, corrosion resistance, dielectric properties, flammability and thermal conductivity. The composite resin, as described above, is a urethane based resin that eliminates the release of volatile organic compounds. In addition, it is capable of providing a range of desirable physical properties. The formulation of the composite resin can be adjusted to provide superior fire retarding characteristics. The formulation can similarly be adjusted to provide superior properties of toughness, impact resistance, weathering resistance, and chemical resistance. In particular, the formulation has a unique capacity for elongation, impact strength and flexibility. This enables composite products made from the composite resin to be receive screws and other rotatable fasteners, whereas products made from existing composite resins are comparatively brittle and tend to shatter when receiving a rotatable fastener.

The selection of particular, polyisocyanate components and particular polyol components is dictated by the physical properties that one is seeking in the composite resin and by economics. An aliphatic polyisocyanate has superior resistance to chemicals and ultra violet rays. It is, therefore, recommended that the aliphatic polyisocyanate be used to the exclusion of the aromatic polyisocyanate, if the best possible composite resin is desired. However, the aliphatic polyisocyanate is much more expensive that the aromatic polyisocyanate. In order to obtain a balance between physical properties and cost, it is, therefore, preferred that the polyisocyanate component be a blend of at least 15% by weight of an aliphatic polyisocyanate with the remainder an aromatic polyisocyanate. Of course, composite resin can use exclusively the aromatic polyisocyanate where resistance to chemicals and ultra violet rays is not of concern. In the polyol component, it is preferred that a polyether polyol be blended with a polyester polyol in order to obtain the best physical properties. The polyether polyol has desired flexibility, but has a low glass transition temperature and poor chemical resistance. It is, therefore, preferred that the polyol component include at least 10% by weight of a polyester polyol with the remainder being a polyether polyol. Of course, the polyether polyol can be used exclusively where maximum flexibility is desired, and neither glass transition temperature nor chemical resistance is of concern. Similarly, the polyester polyol can be used exclusively where flexibility is not required.

When selecting an aromatic polyisocyanate, beneficial results have been obtained with methylene di-p-phenylene isocyanate. Methylene di-p-phenylene isocyanate has been found to have good reactivity and the amount of methylene di-p-phenylene in the composite resin can be used to adjust curing times. Methylene di-p-phenylene, however, tends to be relatively high in viscosity and is a solid in the its pure chemical state. It is, therefore, preferred that the aromatic polyisocyanate also include polymethylene polyphenyl isocyanate. Polymethylene polyphenyl isocyanate has been found to give the composite resin more reactivity and rigidity. It is preferred that the aliphatic polyisocyanate include isophorone diisocyanate polymer, hexamethylene diisocyanate polymer or a blend of both. Hexamethylene diisocyanate polymer has superior chemical resistance and resistance to ultra violet rays, it is, therefore, recommended that hexamethylene diisocyanate polymer be used to the exclusion of isophorone diisocyanate polymer, if the best possible composite resin is desired. However, the hexamethylene diisocyantate is much more expensive that the isophorone diisocyanate polymer. In order to obtain a balance between physical properties and cost, it is, therefore, preferred that the aliphatic polyisocyanate be a blend of at least 15% by weight of hexamethylene diisocyanate polymer with the remainder being isophorone diisocyanate polymer. When selecting a polyester polyol, beneficial results have been obtained with a diethylene glycol-phthalic anhydride. Diethylene glycol-phthalic anhydride has been found to have relatively high glass transition temperature, high reactivity, low cost, and good chemical resistance. When selecting a polyether polyol, a selection should be made based upon whether more importance is placed upon curing time or glass transition temperature. Beneficial results have been obtained controlling curing times through the use of the following polyether polyols, arranged in order of curing time from fastest to slowest: polyoxyalkylene polyol, propoxylated glycerol, branched polyol with ester and ether groups, and amine initiated-hydroxyl terminated polyoxyalkylene polyol. The same polyether polyols have a different rank order when arranged in order of glass transition temperature from highest to lowest: propoxylated glycerol, amine initiated-hydroxyl terminated polyoxyalkylene polyol, polyoxyalkylene polyol, and branched polyol with ester and ether groups. It will appreciated that a compatible wetting agent is required. Beneficial results have been obtained through the use of a polymer of ethylene oxide as the wetting agent.

In most, if not all, applications fiber reinforcement is provided. Without limiting the scope of possible applications, such applications include: pultrusion, resin injection molding, resin transfer molding, and hand lay-up forming applications. There are a variety of fibers that are suitable for use as fiber reinforcement, including: glass, carbon, fiberglass, aramid, polyester, nylon, polyethylene, ceramic, boron, metal, and natural fibers.

In some applications, first retardant properties are either required or viewed as desirable. Even more beneficial results may be obtained when a fire retardant additive added to the composite resin. There are a number of suitable fire retardant additives, including: diammonium phosphate, alumina trihydrate, antimony trioxide, antimony silicon-oxide, zinc borate, barium metaborate, phosphate compounds, extended molybdates, calcium sulfate, and dehydrates.

In many applications, chemical resistant properties are required or viewed as being desirable. In such applications, an aliphatic polyisocyanate is selected that has chemical resistant properties. The particular aliphatic polyisocyanate selected will depend upon what chemical the composite resin is to be resistant to. Some of aliphatic polyisocyanates having chemical resistant properties include: isophorone diisocyanate polymer, hexamethylene diisocyanate polymer and 4,4'-methylenebis (cyclohexyl isocyanate).

More information about formulations for the composite resins will hereinafter be described.

DETAILED DESCRIPTION OF THE PREFERRED EMBODIMENT

A two component chemically thermoset VOC free composite resin that is less expensive and yet has the necessary physical properties for use in a range of commercial composite manufacturing processes can be produced using a solvent free polyisocyanate component and a solvent free polyol component. The solvent free polyisocyanate component is either an aromatic polyisocyanate, an aliphatic polyiscyanate or a blend of both. The solvent free polyol component is either a polyether polyol, a polyester polyol or a blend of both. The polyisocyanate component and the polyol component are in relative proportions in accordance with an OH/NCO equivalent ratio of 1:1 to 1:2.

In addition to eliminating any hazardous components from the resin system, the described composite resin is sufficiently versatile to provide a range of physical properties. By suitably selecting the type and quantity of polyhydroxy compounds, the viscosity of the two component binder mixture as well as the physical properties, the mechanical properties in particular of the resulting composition, may be adjusted to the requirements of a particular product application or composite manufacturing process. The described composite resin system is capable of providing any desired range or combination of the following properties:

Flexibility
Strength
Cost-Effective
Heat moldable after cure
Potlife from 5 minutes to 3 hour
Work time from 5 minutes to 3 hours
Minimal odor
Weather resistant
Water resistant
Transition from liquid to solid is moderate allowing for reshaping, as desired, through the control heat Flexural properties can be adjusted to exceed those for acrylic, polyester, silicone, epoxy, and methyl methacrylate resin systems.

Several preferred formulations of the two component chemically thermoset composite resin will now be described. A general, all purpose, composite resin made in accordance with the teachings of the present invention includes a solvent free polyisocyanate component being a blend of at least 15% by weight of an aliphatic polyisocyanate with the remainder an aromatic polyisocyanate. Pure aliphatic polyisocyanate would be more effective than a blend, due to it's superior resistance to chemicals and ultra violet rays. However, in order to keep the cost of the composite resin down, aromatic polyisocyanate is used with sufficient aliphatic polyisocyanate being added to provide the necessary degree of resistance to chemicals and ultra violet rays required for the intended application. Although pure aromatic polyisocyanate provides satisfactory performance in applications in which resistance to chemicals and ultra violet rays is not of concern, a general or all purpose formulation should have at least 15% aliphatic polyisocyanate.

The aromatic polyisocyanate includes not less than 30% and not more than 60% by weight of methylene di-p-phenylene isocyanate, not less than 30% and not more than 50% by weight of polymethylene polyphenyl isocyanate, with a balance of methylene isocyanatobenzene. It is not desirable to include less than 30% methylene di-p-phenylene isocyanate due to loss of reactivity. It is not desirable to include more than 60% methylene di-p-phenylene isocyanate in an all purpose composite resin as it will make the isocyanate component too viscous and unprocessable for present manufacturing technologies; although there may be some applications for which a more viscous composite resin may be well suited. The polymethylene polyphenyl isocyanate is added in order to lower viscosity. At least 30% by weight of polymethylene polyphenyl isocyanate must be added to have a beneficial effect on viscosity. It is viewed as being undesirable to exceed 50% of polymethylene polyphenyl isocyanatein an all purpose composite resin as the resin will become very soft and slow to cue; although there may be some applications for which a more malleable composite resin may be well suited. The methylene isocyanatobenzene is not a required ingredient. At the present time it is not possible to obtain methylene di-p-phenylene isocyanate without methylene isocyanatobenzenealso being present.

The aliphatic polyisocyanate is a blend of at least 15% by weight of hexamethylene diisocyanate polymer and a balance of isophorone diisocyanate polymer. Pure hexamethylene diisocyanate polymer would be more effective than a blend, due to it's superior resistance to chemicals and ultra violet rays. However, in order to keep the cost of the composite resin down, isophorone diiocyanate polymer is used with sufficient hexamethylene diisocyanate polymer being added to provide the necessary degree of resistance to chemicals and ultra violet rays required for the intended application. Although pure isophorone diiocyanate polymer provides satisfactory performance in applications in which resistance to chemicals and ultra violet rays is not of concern, a general or all purpose formulation should have at least 15% hexamethylene diisocyanate polymer.

The solvent free polyol component is a blend of not less than 10% and not more than 40% by weight of a diethylene glycol-phthalic anhydride based polyester polyol, with the remainder a polyether polyol consisting of not less than 60% and not more than 90% by weight of one or more organic polyhydroxy compounds having an average weight of 70–400 and an average hydroxyl functionality of 2–6. The polyether polyol has desired flexibility, but has a low glass transition temperature and poor chemical resistance. The polyester polyol has a higher glass transition temperature and greater chemical resistance, but lacks flexibility. Pure polyether polyol could be used where glass transition temperature and chemical resistance are not of concern. Similarly, pure polyester polyol could be used where flexibility is not a requirement. In a general or all purpose resin, it is preferred that the polyether polyol be blended with the polyester polyol in order to obtain flexibility with a higher glass transition temperature and greater chemical resistance. At least 10% of the polyester polyol must be added to obtain a beneficial effect on glass transition temperature and chemical resistance. It is viewed as being undesirable to exceed 40% polyester polyol in a general or all purpose resin as it will become too rigid. The selected range between 10% and 40% will depend upon the particular glass transition temperature or the degree of chemical resistance that is desired. When selecting a polyether polyol, the selection made has an effect upon both curing time and glass transition temperature. Beneficial results have been through the use of the following polyether polyols, arranged in order of curing time from fastest to slowest: polyoxyalkylene polyol, propoxylated glycerol, branched polyol with ester and ether groups, and amine initiated-hydroxyl terminated polyoxyalkylene polyol. The same polyether polyols have a different rank order when arranged in order of glass transition temperature from highest to lowest: propoxylated glycerol, amine initiated-hydroxyl terminated polyoxyalkylene polyol, polyoxyalkylene polyol, and branched polyol with ester and ether groups.

It will be appreciated that a compatible wetting agent is required. Beneficial results have been obtained through the use of a polymer of ethylene oxide as the wetting agent.

The above described polyisocyanate component and the polyol component are mixed in relative proportions in accordance with an OH/NCO equivalent ratio of 1:1 to 1:2.

In applications, such as pultrusion, resin injection molding, resin transfer molding, and hand lay-up forming applications, it is desirable to add fiber reinforcement is provided. There are a number of fibers of differing types that can be added to the composite resin as fiber reinforcement, some of which are: glass, carbon, fiberglass, aramid, polyester, nylon, polyethylene, ceramic, boron, metal, and natural fibers.

In applications in which fire retarding properties are desirable, a fire retardant additive can be added. Suitable fire retardant additives include: diammonium phosphate, alumina trihydrate, antimony trioxide, antimony silicon-oxide, zinc borate, barium metaborate, phosphate compounds, extended molybdates, calcium sulfate, and dehydrates.

In applications in which chemical resistance is of concern, the polyisocyanate component is, preferably, an aliphatic polyisocyanate with chemical resistant properties. Beneficial results can be obtained through the use of isophorone diisocyanate polymer, hexamethylene diisocyanate polymer, 4,4'-methylenebis (cyclohexyl isocyanate) or a blend of the same. The selection should be made based upon the types of chemicals to which a resistance is required. Of the three, hexamethylene diisocyanate polymer has the best resistance to aromatic solvents. 4,4'-methylenebis (cyclohexyl isocyanate) has the best resistance to aliphatic solvents. Isophorone diisocyanate has a reasonable degree of resistance to both the aromatic solvents and aliphatic solvents. The best chemical resistance would be obtained through the use of pure hexamethylene diisocyanate. However, hexamethylene diiocyanate is expensive. 4,4'-methylenebis (cyclohexyl isocyanate) is the cheapest, but it has the poorest resistance to aromatic solvents. A blend is, therefore, preferred for a commercial product with more general or all purpose applications. The proportions of the blend will depend upon a combination of desired properties required in addition to chemical resistance. For example, hexamethylene diisocyanate is best able to resist yellowing when exposed to ultra violet rays. Desired flexibility is another factor, hexamethylene diisocyaqate is more flexible than 4,4'-methylenebis (cyclohexyl isocyanate) which, in turn, is more flexible than isophorone diisocyanate. In a chemical resistant formulation it is preferred that the solvent free polyol component be a polyester polyol due to its superior chemical resistance. Preferably a blend of organic hydroxy terminated polyester polyol compounds having an average equivalent weight of 400–1000 used with a compatible wetting agent.

The properties of this composite resin make it particularly suited for use with prosthetics and orthotics. Those properties include the absence of volatile organic solvents, flexibility, strength, heat moldable after cure, adjustable work time from 5 minutes to 3 hours, minimal odor, and transition from liquid to solid is moderate allowing for reshaping, as desired, through the control heat. A particular unique property is the ability of the composite resin to accept rotatable fasteners.

The processing properties for pultrusion of the resin matrix as compared against other resins is as follows:

| PULTRUSION RESIN SYSTEM COMPARSION | | | | |
| --- | --- | --- | --- | --- |
| System | Polyester | Vinyl Ester | Epoxy | Thermoset Polyurethane |
| Resin Type | Orthophthalic Isopthalic Low Profile Halogenated | Epoxy Novolak, methacrylate esters of bisphenol epoxy resins | Epichlorohydrin/ Bisphenol-A | Polyurethane |
| Type Initiator Used | Organic peroxide | Organic peroxide | Amines (preferred, Acid anhydrides) | Polyisocyanate and polyhydroxyl resin |
| Polymerization Characteristics | Gelation occurs prior to exotherm | Gelation ocurs prior to exotherm gelation | Exotherm occurs prior to | Exotherm occurs prior to gelation |
| Volume shrinkage | 7–9% | 7–9% | 1–4% | 0–2% |
| Interfacial adhesion | Low | Medium | High | High |
| Relative line speed | Normal | Slower | Very slow | Normal to High (depending on the profile used) |
| Relative pultrusion difficulty | Nominal | More difficult | Very difficult | Normal |
| Mold temperature | 220–300° F. | 260–320° F. | 400° F. | 300–400° F. |
| After treatment | None | None | Post cure | None |
| Cost/ Economics | Low | Moderate (1.5 × Polyester) | Expensive (2 × Polyester) | Moderate (1.5 × Polyester) |

One formulation of the composite resin that has proven useful for prosthetics includes a solvent free polyisocyanate component of an aromatic polyisocyanate, an aliphatic polyiscyanate or a blend of both, as described above. It also includes a solvent free polyol component which is a blend of at least 10% of a polyester polyol and a balance of a polyether polyol. The polyol component includes not less than 5% and not more than 20% of a hydroxyl terminated vegetable oil. The addition of the vegetable oil contributes to the flexibility of the composite resin, the ability to adjust the cure time and the ability to reshape, as desired, through the control heat. If less than 5% vegetable oil is present there is no noticeable difference in the composite resin. When more than 20% is present, the composite resin becomes too soft. As described above, the polyisocyanate component and the polyol component are in relative proportions in accordance with an OH/NCO equivalent ration of 1:1 to 1:2.

Another formulation of the composite resin that has proven useful for prosthetics includes a solvent free polyisocyanate component of an aromatic polyisocyanate, an aliphatic polyiscyanate or a blend of both, as described above. A solvent free polyol component being a blend of at least 10% of a polyester polyol and a balance of a polyether polyol. Blended with and forming part of the polyol component is not less than 5% and not more than 20% by weight of a bisphenol A epoxy resin. The addition of the epoxy resin in an alternative approach to control the impact resistance and toughness of the composite resin, the ability to adjust the cure time and the ability to reshape, as desired, through the control heat. If less than 5% epoxy resin is present there is no noticeable. difference in the composite resin. When more than 20% is present, the composite resin becomes too rigid. As described above, the polyisocyanate component and the polyol component are in relative proportions in accordance with an OH/NCO equivalent ratio of 1:1 to 1:2.

The use of the above described composite resin can be used to enhance fiber wet out, creating a strong bond, significantly more than just a surface bond, but rather a complete bond throughout the glass matrix. The composite resin has proven to have low moisture absorption, high impact resistance, excellent weatherability, excellent chemical resistance and low density.

The reactivity of the resin system can be augmented by the use of heat and pressure found in use with some composite manufacturing processes. This will enhance the strength of the finished products as well as provide the resin system sufficient external influence to enhance and create acceptable cure rates.

The resin matrix consists of a 2-component system. The preferred polyol component is a blend of polyester and polyether polyols. The second component is a polyisocyanate. The system contains no volatile organic solvents. The potlife and cure time are both affected by temperature. The product exotherms at ~104° C. (220° F.) at which point the product quickly polymerizes.

The resin matrix is produced from polymers in which three-dimensional molecular linkages are formed throughout the bulk polymer. In this type of polymer, a great deal of importance falls on the functionality of the monomer units and degree to which crosslinking takes place in the resin matrix. The functionality of the monomeric moieties defines the microstructural characteristics of the network polymer. The crosslink density, which is dependent on the monomer functionality, ultimately defines the viscoelastic and mechanical properties of the finished product.

The physical characteristics of the material depends on the crosslink density in the polymer—that is, the cure state of the polymer matrix. The cure states refers to the extent to which crosslinking has advanced throughout the polymer network. The crosslink density and the stoichiometric extent of reaction are two of the parameters that characterize the cure state.

During the cure, there is an increase in the average molecular weight of the polymer. The crosslinked networks formed grow in three dimensions. The monomer functionality determines whether chemical crosslinking can take place in a polymerization reaction. Monomer functionality refers to the number of molecular linkages that a monomer can make with other molecules. Monomers with functionality higher than two have additional reactive sites after linear polymerization takes place. When these sites line up, they can form crosslinks between the polymer chains. Some monomers have a higher functionality than others do. This has a significant effect on the potential crosslink density that a polymer system can have. A monomer with a functionality of three can only form half as many crosslinks in its network hat a polymer with a monomer functionality of four. A higher crosslink density means more dimensional stability, high mechanical strength, as well as a higher glass transition temperature. The glass transition temperature is the temperature at which the polymer softens.

The size of the monomer unit plays a role in the crosslink density of a polymer system. If a monomer unit has long polymer chains between functional groups, the final product is much more limited in terms of the final crosslink density. A property derived from the monomer's chemical structure that affects the final glass transition temperature of a polymer is the molecular weight between crosslinks. In general, a higher molecular weight between crosslinks leads to a lower glass transition temperature because of increased flexibility in the individual polymer chains.

The cure time may be shortened as required by utilizing low molecular weight resins with high functionality or lengthened by the use of high molecular weight resins, chain extenders, or glycols.

The individual components are preferably selected such that the binder mixtures obtained by mixing the individual components have a viscosity range of 400–20000 cps and a potlife ranging from 5 minutes to 3 hours.

Besides the two component binders the resin composition according to the invention may contain the known additives used in polyurethane technology such as fillers, pigments, plasticizers, curing catalysts, UV stabilizers, antioxidants, microbiocides, algicides, dehydrators, thixotropic agents, wetting agents, flow modifiers, matting agents, deaerators and extenders. The additives are chosen based on the requirements of the particular application and their compatibility with the individual components. Fillers suitable for two-component polyurethane coating compositions are known and are preferably particulate, spherical or platelike fillers that have low moisture content. Typical representative examples of such fillers are calcium carbonate, quartz powder, kaolin, silica's, ground or precipitated chalks, talc, alumina silicate (clay), alumina trihydrate, wollastonite, titanium dioxide, diammonium phosphate, etc. Fillers can be incorporated in to the resin in quantities up to 50% of the total formulation by weight. The usual volume limitation is based upon the development of usable viscosity that depends upon both the particle size and the characteristics of the resin. Wetting agents have been developed which offer the incorporation of greater filler volume without increasing formula viscosity and can be predispersed on the filler or added as required by the formulator.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims.

The embodiments of the invention in which an exclusive property or privilege is claimed are defined as follows:

1. A two component chemically thermoset composite resin, comprising:

a solvent free polyisocyanate component selected from at least one of an aromatic polyisocyanate and an aliphatic polyisocyanate; and a solvent free polyol component selected from at least one of a polyether polyol and a polyester polyol, the polyol including:

not less than 10% and not more than 40% by weight of a diethylene glycol-phthalic anhydride based polyester polyol;

not less than 60% and not more than 90% by weight of one or more organic polyhydroxy compounds having an average weight of 70–400 and an average hydroxyl functionality of 2–6, the polyhydroxy compounds being selected from: amine initiated-hydroxyl terminated polyoxyalkylene polyol, branched polyol with ester and ether groups, propoxylated glycerol, polyoxyalkylene polyol; and a compatible wetting agent;

the polyisocyanate component and the polyol component being in relative proportions in accordance with an OH/NCO equivalent ratio of 1:1 to 1:2.

2. The composite resin as defined in claim 1, wherein the aromatic polyisocyanate includes methylene di-p-phenylene isocyanate.

3. The composite resin as defined in claim 2, wherein the aromatic polyisocyanate also includes polymethylene polyphenyl isocyanate.

4. The composite resin as defined in claim 3, wherein the aromatic polyisocyanate includes:

not less than 30% and not more than 60% by weight of methylene di-p-phenylene isocyanate;

not less than 30% and not more than 50% by weight of polymethylene polyphenyl isocyanate; and a balance of methylene isocyanatobenzene.

5. The composite resin as defined in claim 1, wherein the aliphatic polyisocyanate includes at least one of isophorone diisocyanate polymer, and hexamethylene diisocyanate polymer.

6. The composite resin as defined in claim 4, wherein the aliphatic polyisocyanate is a blend of at least 15% by weight of hexamethylene diisocyanate polymer and a balance of isophorone diisocyanate polymer.

7. The composite resin as defined in claim 1, wherein the wetting agent is a polymer of ethylene oxide.

8. The composite resin as defined in claim 1, wherein fiber reinforcement is provided.

9. The composite resin as defined in claim 8, wherein the fiber reinforcement includes fibers selected from at least one of glass, carbon, fiberglass, aramid, polyester, nylon, polyethylene, ceramic, boron, metal, and natural fibers.

10. The composite resin as defined in claim 1, wherein a fire retardant additive is provided.

11. The composite resin as defined in claim 10, wherein the fire retardant additive is selected from at least one of diammonium phosphate, alumina trihydrate, antimony trioxide, antimony silicon-oxide, zinc borate, barium metaborate, phosphate compounds, extended molybdates, calcium sulfate, and dehydrates.

12. The composite resin as defined in claim 1, wherein the solvent free polyisocyanate component includes an aliphatic polyisocyanate with the particular aliphatic polyisocyanate having selected chemical resistant properties.

13. The composite resin as defined in claim 12, wherein the aliphatic polyisocyanate with selected chemical resistant properties includes at least one of isophorone diisocyanate polymer, hexamethylene diisocyanate polymer and 4,4'-methylenebis(cyclohexyl isocyanate).

14. A two component chemically thermoset composite resin, comprising:

a solvent free polyisocyanate component being a blend of at least 15% by weight of an aliphatic polyisocyanate with the remainder an aromatic polyisocyanate; and a solvent free polyol component being a blend of at least 10% by weight of a polyester polyol with the remainder a polyether polyol, the polyol including:

not less than 10% and not more than 40% by weight of a diethylene glycol-phthalic anhydride based polyester polyol;

not less than 60% and not more than 90% by weight of one or more organic polyhydroxy compounds having an average weight of 70–400 and an average hydroxyl functionality of 2–6, the polyhydroxy compounds being selected from: amine initiated-hydroxyl terminated polyoxyalkylene polyol, branched polyol with ester and ether groups, propoxylated glycerol, polyoxyalkylene polyol; and a compatible wetting agent;

the polyisocyanate component and the polyol component being in relative proportions in accordance with an OH/NCO equivalent ratio of 1:1 to 1:2.

15. The composite resin as defined in claim 14, wherein the polyol component includes not less than 5% and not more than 20% by weight of a hydroxyl terminated vegetable oil.

16. The composite resin as defined in claim 14, wherein blended with and comprising part of the polyol component is not less than 5% and not more than 20% by weight of a bisphenol A epoxy resin.

17. The composite resin as defined in claim 14, wherein the aromatic polyisocyanate includes methylene di-p-phenylene isocyanate.

18. The composite resin as defined in claim 17, wherein the aromatic polyisocyanate also includes polymethylene polyphenyl isocyanate.

19. The composite resin as defined in claim 18, wherein the aromatic polyisocyanate includes:

not less than 30% and not more than 60% by weight of methylene di-p-phenylene isocyanate;

not less than 30% and not more than 50% by weight of polymethylene polyphenyl isocyanate; and a balance of methylene isocyanatobenzene.

20. The composite resin as defined in claim 14, wherein the aliphatic polyisocyanate includes at least one of isophorone diisocyanate polymer, and hexamethylene diisocyanate polymer.

21. The composite resin as defined in claim 20, wherein the aliphatic polyisocyanate is a blend of at least 15% by weight of hexamethylene diisocyanate polymer and a balance of isophorone diisocyanate polymer.

22. The composite resin as defined in claim 14, wherein the wetting agent is a polymer of ethylene oxide.

23. The composite resin as defined in claim 14, wherein fiber reinforcement is provided.

24. The composite resin as defined in claim 23, wherein the fiber reinforcement includes fibers selected from at least one of glass, carbon, fiberglass, aramid, polyester, nylon, polyethylene, ceramic, boron, metal, and natural fibers.

25. The composite resin as defined in claim 14, wherein a fire retardant additive is provided.

26. The composite resin as defined in claim 25, wherein the fire retardant additive is selected from at least one of diammonium phosphate, alumina trihydrate, antimony trioxide, antimony silicon-oxide, zinc borate, barium metaborate, phosphate compounds, extended molybdates, calcium sulfate, and dehydrates.

27. The composite resin as defined in claim 14, wherein the solvent free polyisocyanate component includes an aliphatic polyisocyanate with the particular aliphatic polyisocyanate having selected chemical resistant properties.

28. The composite resin as defined in claim 27, wherein the aliphatic polyisocyanate with chemical resistant properties includes at least one of isophorone diisocyanate polymer, hexamethylene diisocyanate polymer and 4,4'-methylenebis(cyclohexyl isocyanate).

29. A two component chemically thermoset composite resin, comprising:
a solvent free polyisocyanate component being a blend of at least 15% by weight of an aliphatic polyisocyanate with the remainder an aromatic polyisocyanate;
the aromatic polyisocyanate including:
not less than 30% and not more than 60% by weight of methylene di-p-phenylene isocyanate;
not less than 30% and not more than 50% by weight of polymethylene polyphenyl isocyanate; and
a balance of methylene isocyanatobenzene;
the aliphatic polyisocyanate being a blend of at least 15% by weight of hexamethylene diisocyanate polymer and a balance of isophorone diisocyanate polymer;
a solvent free polyol component being a blend of not less than 10% and not more than 40% by weight of a diethylene glycol-phthalic anhydride based polyester polyol, with the remainder a polyether polyol consisting of not less than 60% and not more than 90% by weight of one or more organic polyhydroxy compounds having an average weight of 70–400 and an average hydroxyl functionality of 2–6, the polyhydroxy compounds being selected from: amine initiated-hydroxyl terminated polyoxyalkylene polyol, branched polyol with ester and ether groups, propoxylated glycerol, polyoxyalkylene polyol; and
a compatible wetting agent,
the polyisocyanate component and the polyol component being in relative proportions in accordance with an OH/NCO equivalent ratio of 1:1 to 1:2.

30. The composite resin as defined in claim 29, wherein the wetting agent is a polymer of ethylene oxide.

31. The composite resin as defined in claim 29, wherein fiber reinforcement is provided.

32. The composite resin as defined in claim 31, wherein the fiber reinforcement includes fibers selected from at least one of glass, carbon, fiberglass, aramid, polyester, nylon, polyethylene, ceramic, boron, metal, and natural fibers.

33. The composite resin as defined in claim 29, wherein a fire retardant additive is provided.

34. The composite resin as defined in claim 33, wherein the fire retardant additive is selected from at least one of diammonium phosphate, alumina trihydrate, antimony trioxide, antimony silicon-oxide, zinc borate, barium metaborate, phosphate compounds, extended molybdates, calcium sulfate, and dehydrates.

35. A two component chemically thermoset composite resin, comprising:
a solvent free polyisocyanate component being an aliphatic polyisocyanate with chemical resistant properties selected from at least one of isophorone diisocyanate polymer, hexamethylene diisocyanate polymer, and 4,4'-methylenebis(cyclohexyl isocyanate);
a solvent free polyol component being at least one organic hydroxy terminated polyester polyol compounds having an average equivalent weight of 400–1000, the polyol component including:
not less than 10% and not more than 40% by weight of a diethylene glycol-phthalic anhydride based polyester polyol;
not less than 60% and not more than 90% by weight of one or more organic polyhydroxy compounds having an average weight of 70–400 and an average hydroxyl functionality of 2–6, the polyhydroxy compounds being selected from: amine initiated-hydroxyl terminated polyoxyalkylene polyol, branched polyol with ester and ether groups, propoxylated glycerol, polyoxyalkylene polyol; and
a compatible wetting agent;
the polyisocyanate component and the polyol component being in relative proportions in accordance with an OH/NCA equivalent ratio of 1:1 to 1:2.

36. A two component chemically thermoset composite resin, comprising:
a solvent free polyisocyanate component selected from at least one of an aromatic polyisocyanate and an aliphatic polyisocyanate; and
a solvent free polyol component being a blend of at least 10% of a polyester polyol and a balance of a polyether polyol, the polyol component including:
not less than 10% and not more than 40% by weight of a diethylene glycol-phthalic anhydride based polyester polyol;
not less than 60% and not more than 90% by weight of one or more organic polyhydroxy compounds having an average weight of 70–400 and an average hydroxyl functionality of 2–6, the polyhydroxy compounds being selected from: amine initiated-hydroxyl terminated polyoxyalkylene polyol, branched polyol with ester and ether groups, propoxylated glycerol, polyoxyalkylene polyol; and
a compatible wetting agent;
the blend including not less than 5% and not more than 20% of a hydroxyl terminated vegetable oil;
the polyisocyanate component and the polyol component being in relative proportions in accordance with an OH/NCO equivalent ratio of 1:1 to 1:2.

37. A two component chemically thermoset composite resin, comprising:
a solvent free polyisocyanate component selected from at least one of an aromatic polyisocyanate and an aliphatic polyisocyanate;
a solvent free polyol component being a blend of at least 10% of a polyester polyol and a balance of a polyether polyol, blended with and forming part of the polyol component is not less than 5% and not more than 20% by weight of a bisphenol A epoxy resin;
the polyisocyanate component and the polyol component being in relative proportions in accordance with an OH/NCO equivalent ratio of 1:1 to 1:2.

* * * * *